United States Patent
Nelson et al.

(10) Patent No.: US 9,457,826 B2
(45) Date of Patent: Oct. 4, 2016

(54) CATALYST LOADING AND UNLOADING DEVICE AND METHODS THEREFOR

(71) Applicant: Babcock & Wilcox Power Generation Group, Inc., Barberton, OH (US)

(72) Inventors: Norman D Nelson, Akron, OH (US); Adam N DePizzo, Akron, OH (US)

(73) Assignee: The Babcock & Wilcox Company, Baberton, OH (US)

( * ) Notice: Subject to any disclaimer, the term of this patent is extended or adjusted under 35 U.S.C. 154(b) by 181 days.

(21) Appl. No.: 14/013,474

(22) Filed: Aug. 29, 2013

(65) Prior Publication Data
US 2014/0227073 A1     Aug. 14, 2014

Related U.S. Application Data
(60) Provisional application No. 61/752,667, filed on Jan. 15, 2013.

(51) Int. Cl.
| | |
|---|---|
| B66F 5/04 | (2006.01) |
| B62B 3/06 | (2006.01) |
| B66F 9/04 | (2006.01) |
| H04L 29/06 | (2006.01) |

(52) U.S. Cl.
CPC ............... B62B 3/0618 (2013.01); B66F 9/04 (2013.01); H04L 65/40 (2013.01)

(58) Field of Classification Search
CPC .......... B66F 5/04; B66F 5/02; B66F 7/0658; B66F 9/02; B66F 9/12; B62B 3/0625
See application file for complete search history.

(56) References Cited

U.S. PATENT DOCUMENTS

| | | | | |
|---|---|---|---|---|
| 4,415,149 A | * | 11/1983 | Rees ......................... | B25H 1/04 108/116 |
| 4,927,128 A | * | 5/1990 | O'Brian ................. | A47B 3/087 108/36 |
| 5,950,999 A | * | 9/1999 | Lin ........................... | B25H 1/14 269/139 |
| 6,779,787 B2 | * | 8/2004 | Gryder ..................... | B23Q 1/032 269/289 R |
| 7,232,120 B2 | * | 6/2007 | Campbell ............... | B25B 1/125 269/139 |
| 7,448,606 B1 | * | 11/2008 | Johnson .............. | B05B 13/0285 269/16 |
| 2008/0179804 A1 | * | 7/2008 | McIntosh ................ | B25B 5/122 269/32 |
| 2009/0178596 A1 | * | 7/2009 | Skiba ..................... | A47B 13/00 108/102 |
| 2011/0227271 A1 | * | 9/2011 | Edelmann ................ | B25H 1/10 269/289 R |

* cited by examiner

Primary Examiner — Lee D Wilson
(74) Attorney, Agent, or Firm — Eric Marich; Christopher L. Smith (57) ABSTRACT

An overhead catalyst loading device eliminates the need for lower flanges of the overhead catalyst structural support frame or dedicated overhead trolley beams to prevent ash build up collecting on a SCR reactor box and provides an advantageous lifting mechanism suitable for integration into a SCR device. The overall width of the SCR device is reduced since the structural support frame in the SCR device fits in the gaps between catalyst blocks. No extra space is required on either side of the catalyst blocks for the structural support frame. The overhead catalyst loading device also minimizes the chance of injury during catalyst block installation by using a hydraulic actuated lifting mechanism for loading and unloading catalyst blocks into and out of a SCR device. Methods of lifting and loading and unloading a catalyst block are also presented therein.

15 Claims, 5 Drawing Sheets

CATALYST LOADING AND UNLOADING DEVICE AND METHODS THEREFOR

PRIORITY CLAIM

This application claims priority to U.S. Patent Application Ser. No. 61/752,667, filed Jan. 15, 2013 and titled "CATALYST LOADING AND UNLOADING DEVICE AND METHODS THEREFOR". The disclosure of this priority application is hereby incorporated by reference in its entirety.

BACKGROUND

The present invention generally relates to a selective catalytic reduction (SCR) device for converting $NO_x$ in the gas stream into $H_2O$ and $N_2$. More particularly, the present invention is directed to a catalyst loading device for loading and unloading catalyst blocks in an SCR, and methods therefor.

SCRs using catalyst blocks are often used in applications where $NO_x$ removal from flue gases is needed. In such cases, the SCR catalyst blocks are placed within the SCR reactor through which the combustion flue gases are conveyed. In order to remain effective, the catalyst should be protected from accumulation of particulate contaminants, which may deposit on the catalyst or otherwise restrict gas flow to and/or through the catalyst. Also catalyst is deactivated over time by the NOx removal process. In either case, removal and replacement or reloading of a catalyst may be periodically required.

Typically, catalyst loading devices used in the industry run on the lower flanges of the overhead catalyst structural support frame or dedicated overhead trolley beams. This means that the shapes of the catalyst supporting beams are typically constructed of overhead trolley beams with flanges. These flanges continue to be a problem since they can collect ash which can fall off and are a starting place for catalyst pluggage.

Catalyst loading device structural support frames that require lifting from underneath the catalyst blocks continue to be a problem since they must be wider than the catalyst blocks, requiring extra space on one side of the block for the structural support frame, which also increases the overall width of the catalyst reactor box.

One method of loading and unloading catalyst blocks in a SCR device typically uses pry bars for final placement, which may increase the chance of personal injury.

It would be desirable to provide a catalyst loading device that eliminates the need for overhead trolley beams with ledges in the form of the support beam flanges to prevent ash build up collecting on the SCR reactor box and provides an advantageous lifting mechanism suitable for integration into the SCR unit, which remains of significant commercial interest in the industry.

BRIEF DESCRIPTION OF INVENTION

The present invention is directed to a catalyst loading device and a method for loading and unloading catalyst blocks in a selective catalytic reduction (SCR) device.

In accordance with one embodiment of the present invention, an overhead catalyst loading device eliminates the need for lower flanges of the overhead catalyst structural support frame or dedicated overhead trolley beams to prevent ash build up collecting on the SCR reactor box and provides an advantageous lifting mechanism suitable for integration into the SCR device. The lifting mechanism can be designed to straddle the catalyst blocks in either their width (short) or length (long) dimension based on the requirements of the SCR device and equipment or component arrangement. Furthermore, it also minimizes the chance of injury during catalyst block installation by using a hydraulic actuated lifting mechanism for loading and unloading the catalyst blocks into the SCR device.

The problem of ash collection on the flanges of overhead trolley beams which can fall off and be a starting place for catalyst pluggage is solved by an overhead catalyst loading device that eliminates the need for overhead trolley beams with ledges in the form of the support beam flanges to prevent ash build up collecting on the SCR reactor box.

The problem of requiring extra space on one side of the catalyst blocks within the SCR reactor box for the structural support frame is solved by the fact that the structural support frame in the SCR device for the catalyst loading device is required to be no wider than the catalyst blocks. Therefore, no extra space is required on either side of the catalyst blocks for structural support frame or grating removal and the overall width of the SCR device is reduced.

The problem of using pry bars for final placement of catalyst blocks during loading and unloading that increases the chance of personal injury is solved by using a hydraulic actuated lifting mechanism for loading and unloading the catalyst blocks into the SCR device.

The catalyst loading device is advantageously constructed of conventional steel or other suitable material structural members (angles, C-sections, I-beams, T-beams, box sections, bar or flat stock, etc.) to reduce costs.

The catalyst loading device comprises a support structure, which includes a support frame constructed of structural members welded together supported by legs. The legs are constructed of tubes movably inserted into each other so the height of the support frame is adjustable via inserting pins through holes in the tubes at a desired height. The height adjustable design allows the catalyst loading device to be adaptable for use with various catalyst block designs and sizes.

A lifting structure is movably engaged with respect to the support structure. The lifting structure comprises structural members welded together to form a rectangular or square lifting frame. Furthermore, structural members are welded to the top of the lifting frame and lifting lugs are welded to these structural members for coupling the catalyst blocks to the lifting structure for loading and unloading the blocks in the SCR device. In another embodiment, lifting lugs may also be assembled at other locations of the lifting structure (e.g., a front-side and/or a back-side of the lifting structure). A lifting bar is also assembled to the catalyst loading device for lifting the catalyst loading device itself for loading and unloading the device into and out of the SCR device.

Accordingly, one aspect of the present invention is drawn to a catalyst loading device, comprising: a support structure; a lifting structure movably engaged with respect to the support structure; and means for coupling catalyst blocks to the lifting structure. The means for coupling the catalyst to the lifting structure includes lifting lugs, pins, fasteners, bolts, or any suitable device known to one skilled in the art, but not limited thereto.

The lifting structure may comprise a lifting mechanism for loading and unloading the catalyst blocks into a SCR device. Accordingly, another aspect of the present invention is drawn to a lifting mechanism, comprising: at least one hydraulic cylinder; at least one linking rod connected to the at least one hydraulic cylinder; at least one lifting arm connected to the at least one linking rod; at least one lifting rod connected to the at least one lifting arm; and at least one lifting cam connected to the at least one lifting rod.

The present invention facilitates movement of catalyst blocks in an SCR device. The catalyst loading device is maneuvered into place over the catalyst blocks and removably coupled to the catalyst blocks for loading and unloading of the blocks in an SCR device. The catalyst loading device moves into place via wheels on the top flange surface of the structural support frame (not shown) straddling catalyst blocks between the legs. Tubes of the support frame are positioned to the desired height and pins are inserted through corresponding holes in the tubes to secure the support frame at the desired height. Catalyst blocks are then coupled via lifting lugs on the catalyst loading devices lifting structure.

Another aspect of the present invention is drawn to a method of lifting a catalyst block, wherein a hydraulic pump provides pressure to a hydraulic cylinder in order to actuate and extend a linking rod at a first end, wherein forces are transmitted along the linking rod to a first end of a lifting arm, wherein the application of force by the hydraulic cylinder causes the lifting arm, a lifting rod, and a lifting cam to rotate about the longitudinal axis of the lifting rod, wherein the lifting cam engages a lifting frame of a lifting structure, and the force exerted by the hydraulic cylinder is transmitted into the lifting structure, causing it to be displaced vertically, thereby lifting the catalyst block coupled thereto. The hydraulic pump may be an electric or manual hydraulic pump, but not limited thereto.

Once the catalyst blocks are moved into position in the SCR device, the pressure exerted by hydraulic pump may be released, permitting the hydraulic cylinders and their attached linking rods to retract. This permits the assembly of the lifting arm, lifting rod, and lifting cam to rotate in the opposite direction to lower the lifting frame. The lifting frame is then reengaged with the support frame to load the catalyst blocks into the SCR device. Catalyst blocks are de-coupled from lifting frame once they are in a desired position. The catalyst loading device allows the catalyst blocks to be set directly in place without the use of a pry bar, thereby minimizing the chance of personal injury.

Accordingly, another aspect of the present invention is drawn to a method of loading and unloading a catalyst block into an SCR device, comprising the steps of: moving a catalyst loading device via wheels attached thereto over top of the catalyst block; positioning a support frame of a support structure of the catalyst loading device to a desired height; securing the support frame at the desired height; coupling the catalyst block to a lifting structure of the catalyst loading device; operating a lifting mechanism and engaging the lifting mechanism with the lifting structure, causing it to be displaced vertically from the support structure, thereby lifting the catalyst block coupled thereto; moving the catalyst loading device into a desired position for loading or unloading the catalyst block; disengaging the lifting mechanism with the lifting structure allowing the lifting structure to reengage with the support structure; decoupling the catalyst blocks from the catalyst loading device allowing the catalyst block to be placed at the desired position.

Accordingly, yet another aspect of the present invention is drawn to a method of loading and unloading a catalyst block into an SCR device, wherein a hydraulic pump provides pressure to a hydraulic cylinder in order to actuate and extend a linking rod at a first end, wherein forces are transmitted along the linking rod to a first end of a lifting arm, wherein the application of force by the hydraulic cylinder causes the lifting arm, a lifting rod, and a lifting cam to rotate about the longitudinal axis of the lifting rod, wherein the lifting cam engages a lifting frame of a lifting structure, and the force exerted by the hydraulic cylinder is transmitted into the lifting structure, causing it to be displaced vertically, thereby lifting the catalyst block coupled thereto, wherein once the catalyst block is moved to a desired position, the pressure exerted by the hydraulic pump is released, permitting the hydraulic cylinders and their attached linking rods to retract and the assembly of the lifting arm, lifting rod, and lifting cam to rotate in the opposite direction to lower the lifting frame, wherein the lifting frame reengages a support structure, and the catalyst blocks are de-coupled from the lifting structure. The hydraulic pump may be an electric or manual hydraulic pump, but not limited thereto.

In another embodiment of the present invention, removable fasteners such as screws, bolts, keyed, pinned or splined connections, or other structures known to one of ordinary skill in the art may be used in lieu of welded connections.

In another embodiment of the present invention, the support structure may be comprised of tubular or solid circular, square, or other shapes known to one of ordinary skill in the art.

In another embodiment, the hydraulic cylinders may be offset with respect to one another instead of directly opposed and in line with one another. For example, one hydraulic cylinder may be mounted towards the front side of the catalyst loading device, while the other is mounted towards the back side of the catalyst loading device.

In another embodiment, multiple lifting mechanisms may be employed, each comprising single or plural sets of hydraulic cylinders.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated. These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION OF INVENTION

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

It should be noted that some terms used herein are relative terms. For example, the terms "front", "back", "first", "second" are relative to the view shown in the figure, and should not be construed as requiring a particular orientation or location of the structure. For example, although the lifting mechanism is depicted as being located towards the backside of the catalyst loading device, it may alternatively be located at the front side. Similarly, the terms "upper" and "lower" are relative to each other in location, i.e. an upper component is located at a higher elevation than a lower component. Furthermore, the terms "width", "length", "short", and "long" are relative to each other in size or measurement, i.e. width or short side is smaller in distance than a length or long side of a component.

The term "vertical" is used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other.

To the extent that explanations of certain terminology or principles of the heat exchanger, boiler, and/or steam generator arts may be necessary to understand the present disclosure, and for a more complete discussion of catalyst-containing devices, SCRs, or of the design of modern utility and industrial boilers, the reader is referred to *Steam/its generation and use*, 41$^{st}$ Edition, Kitto and Stultz, Eds., Copyright © 2005, The Babcock & Wilcox Company, Barberton, Ohio, U.S.A., the text of which is hereby incorporated by reference as though fully set forth herein.

The present invention is directed to a catalyst loading device and a method for loading and unloading catalyst blocks in a SCR device. The present invention moves via wheels on the top flange surface of the structural support frame (not shown) that the catalyst blocks rest on inside the SCR device. Therefore, the shape of the structural support frame has no effect on the function of the catalyst loading device and fits in the gaps between catalyst blocks. The present invention eliminates the need for overhead trolley beams with ledges in the form of the support beam flanges that ash would otherwise collect on in the SCR reactor box. The ash collection in the SCR reactor is dramatically reduced, thus minimizing ash clumps from falling on the catalyst blocks and creating a starting spot for pluggage.

Since the structural support frame in the SCR for the catalyst loading device fits in the gaps between the catalyst blocks, no extra space is required on either side of the catalyst blocks for the structural support frame or grating removal. Permanent grating can be left in place for personal protection at all times without interfering with installation of the catalyst blocks or operation of the SCR device Moreover, the catalyst loading device works equally well when only temporary grating is permitted to minimize ash buildup with fuels that readily adhere to one another. In this case, there is only one small opening in the grating at any time corresponding to the size of a catalyst block. Furthermore, the overall width of the SCR device is reduced.

Figure 1:
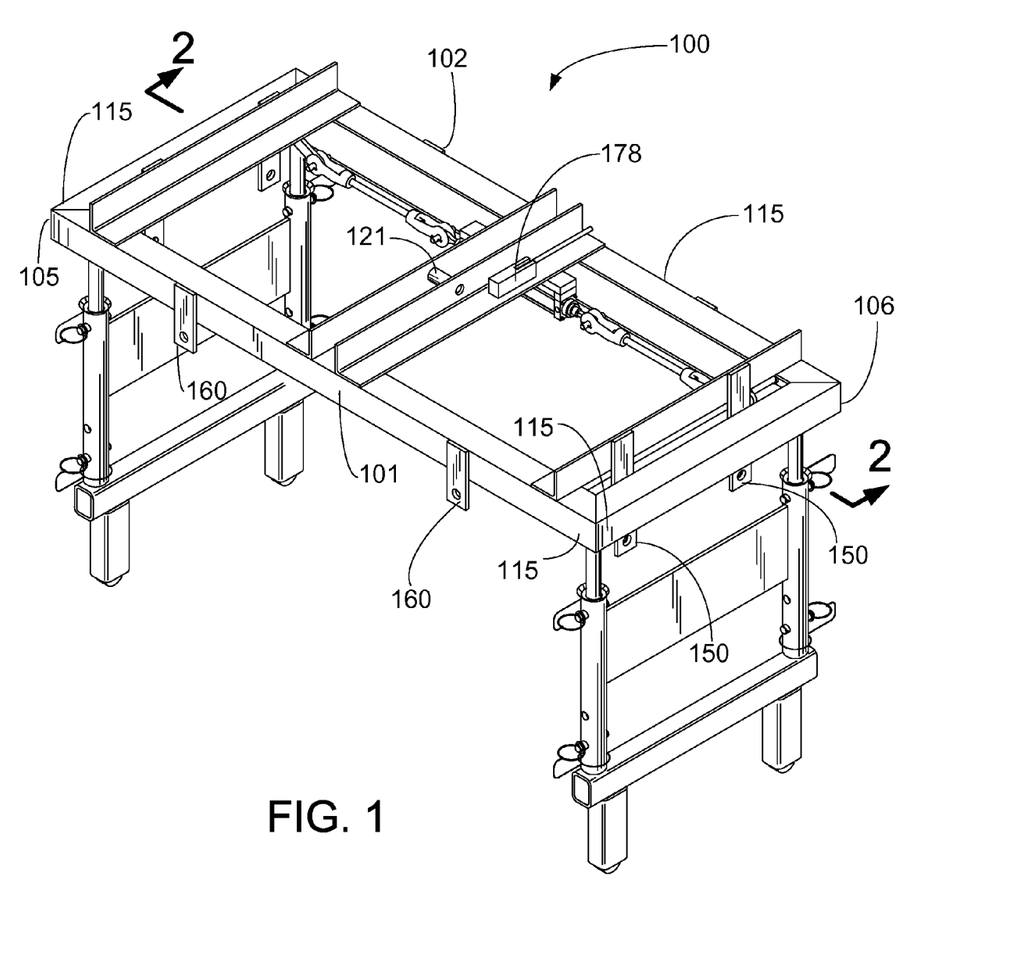
FIG. 1 illustrates a perspective view of one embodiment of the catalyst loading device of the present disclosure.

Referring to the drawings generally, wherein like reference numerals designate the same or functionally similar elements throughout the several drawings, and to FIG. 1 in particular, there is shown a perspective view of a first embodiment of a catalyst loading device, generally designated 100. The catalyst loading device has a front side 101 and a back side 102, and a first end 105 and a second end 106.

Figure 2:
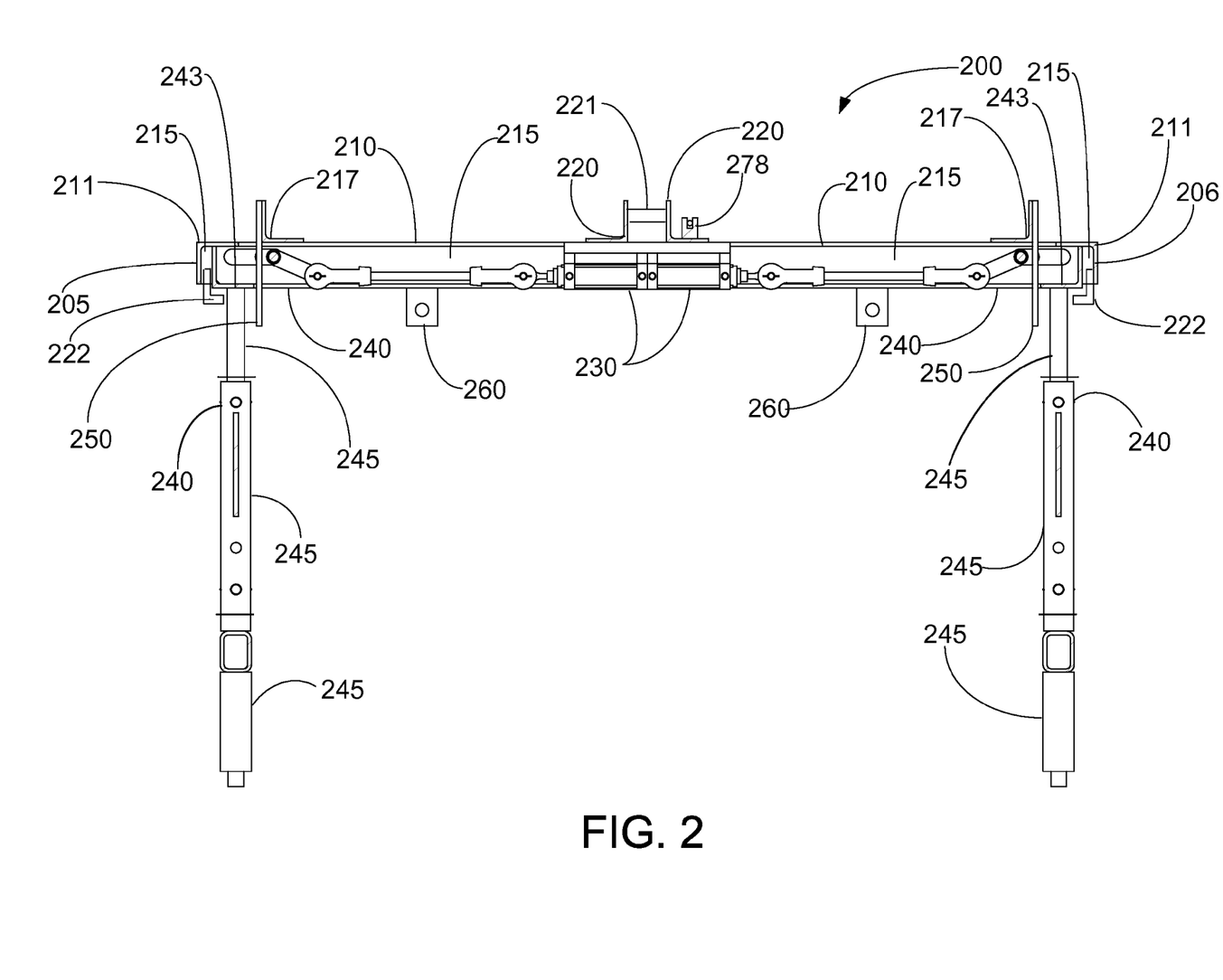
FIG. 2 illustrates a front section view (Section 2-2 from FIG. 1) of one embodiment of the catalyst loading device of the present disclosure.

Referring to FIG. 2, there is illustrated a front section view (Section 2-2 from FIG. 1) of the catalyst loading device generally designated 200 having a lifting structure 210 movably engaged with respect to a support structure 240.

Lifting structure 210 comprises four structural members 211 welded together to form a rectangular or square lifting frame 215 (also see lifting frame 115 in FIG. 1). Two structural members 217 are welded to the top of the lifting frame 215, one towards the first end 205 and the other towards the second end 206 just inside legs 245 of the support structure 240. Lifting lugs 250 are welded to structural members 217 for coupling to the catalyst blocks 590 (see FIG. 5) for loading and unloading the catalyst blocks 590 into and out of the SCR device. In another embodiment, lifting lugs 260 may also be assembled at the front side 101 and the back side 102 of the lifting frame 215 (see also FIG. 1). Accordingly, in another embodiment, only lifting lugs 260 may be assembled at the front side 101 and the back side 102 of the lifting frame 215 in lieu of lifting lugs 250. In other embodiments of the invention, lifting lugs may be assembled at other various locations on the lifting structure and at other various locations around the lifting frame.

On top of the lifting frame 215, two structural members 220 are welded approximately in the center to provide assembly and loading support. The word "center" in this context refers to the relationship of the structural members 220 relative to the symmetrical axis between the legs 245 in FIG. 2, and not to a specific center point or location in space. The two structural members 220 are actually welded slight offset from the center. Bar 221 is welded between the two structural members 220 to provide a lifting point for loading and unloading the catalyst loading device 200 into and out of the SCR device. L-brackets 222 are welded at various locations around the lifting frame 215 to movably engage with the support structure 240 when lifting the catalyst loading device 200 so that the lifting structure and support structure move together during the lift.

Figure 3:
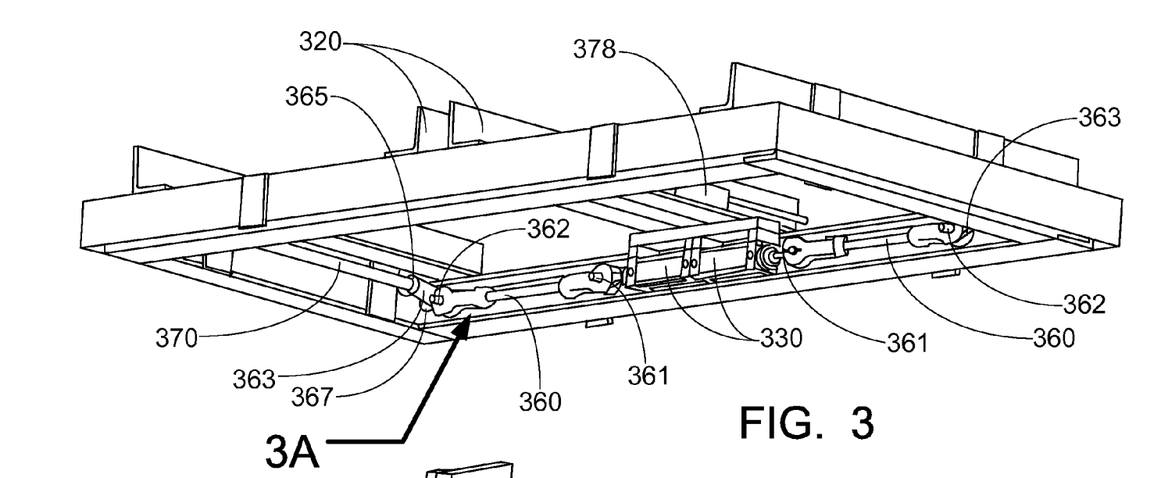
FIG. 3 illustrates a perspective bottom view of one embodiment of the catalyst loading device of the present disclosure showing the support frame, lifting structure, and the lifting mechanism.
Figure 3A:
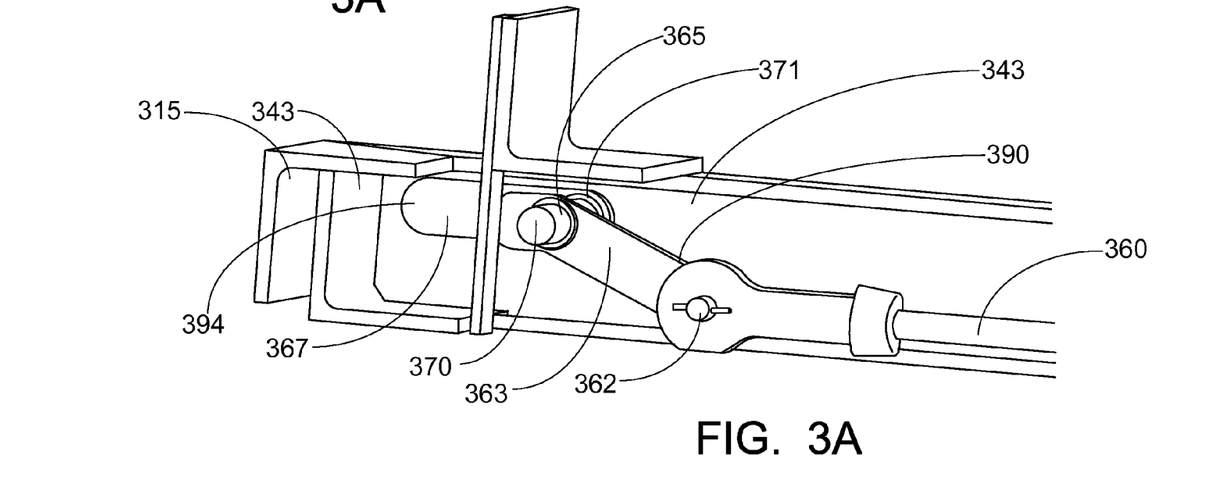
FIG. 3A illustrates a perspective section view FIG. 3 of one end of one embodiment of the catalyst loading device of the present disclosure and the lifting mechanism.

The lifting structure may comprise a lifting mechanism for loading and unloading the catalyst blocks into a SCR device. The lifting mechanism comprises at least one: hydraulic cylinder 330; a linking rod 360 connected to the hydraulic cylinder 330; a lifting arm 363 connected to the linking rod 360; a lifting rod 370 connected to the lifting arm 363; and a lifting cam 367 connected to the lifting rod 370. Referring to FIGS. 3 and 3A, the hydraulic cylinders 330 are mounted to structural members 320. Linking rods 360 each comprise a rod; and a clevis and a pin are provided on each end thereof. Each linking rod 360 is connected to the hydraulic cylinders 330 at a first end 361. Linking rods 360 extend outwardly from hydraulic cylinders 330 and rotatably connect to lifting arms 363 at a second end 362. Lifting arms 363 connect rigidly to lifting rod 370 at a second end 365. Referring to FIG. 3A, lifting cams 367 rigidly connect to linking rod 370 at a first end 371 slightly offset from the second end 365 of lifting arms 363. Lifting rod 370 rotatably extends through a bushing (not shown) in a support frame 343. A hydraulic pump 378 is mounted on angle 320 for pressurizing the hydraulic cylinders to actuate the lifting mechanism to raise and lower the lifting structure 210. The hydraulic pump may be an electric or manual hydraulic pump, but not limited thereto.

Figure 4:
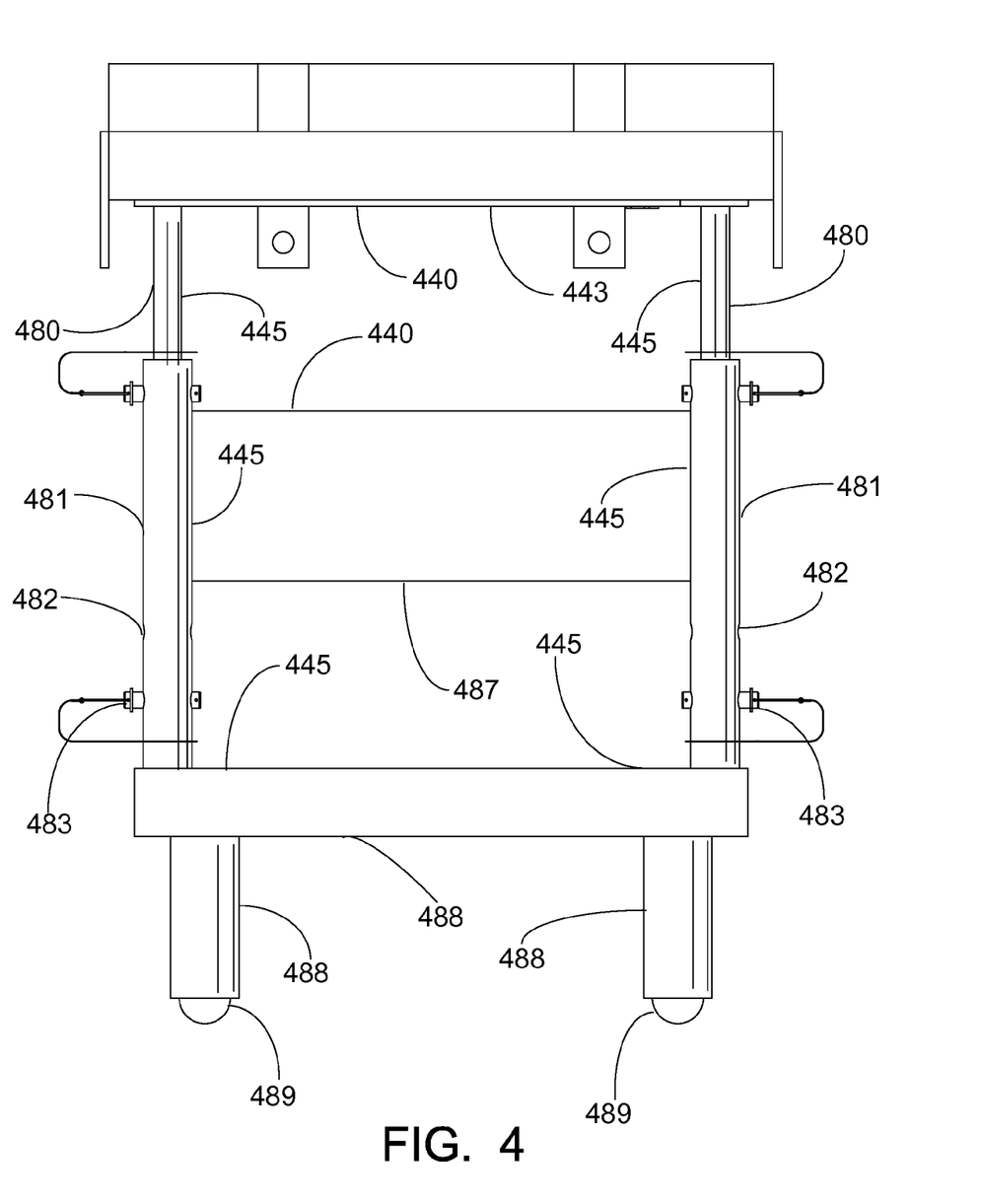
FIG. 4 illustrates a side view of one embodiment of the catalyst loading device of the present disclosure.

Referring to FIG. 4, support structure 440 comprises a support frame 443 supported by legs 445 (see also FIG. 2). Tubes 480 are welded to the support frame 443 and movably inserted into tubes 481 of legs 445. The tubes 480 and 481 have holes 482, which together with pins 483, allow for adjusting the height of the support structure 440. The pins 483 are inserted through holes 482 in tubes 480 and 481 once the tubes 480 are adjusted to the desired height for support structure 440. A support brace 487 is welded between tubes 481 to provide extra support during loading and unloading of the catalyst blocks 590. Legs 445 further comprise a bottom support 488 with wheels 489 assembled thereto.

Figure 5:
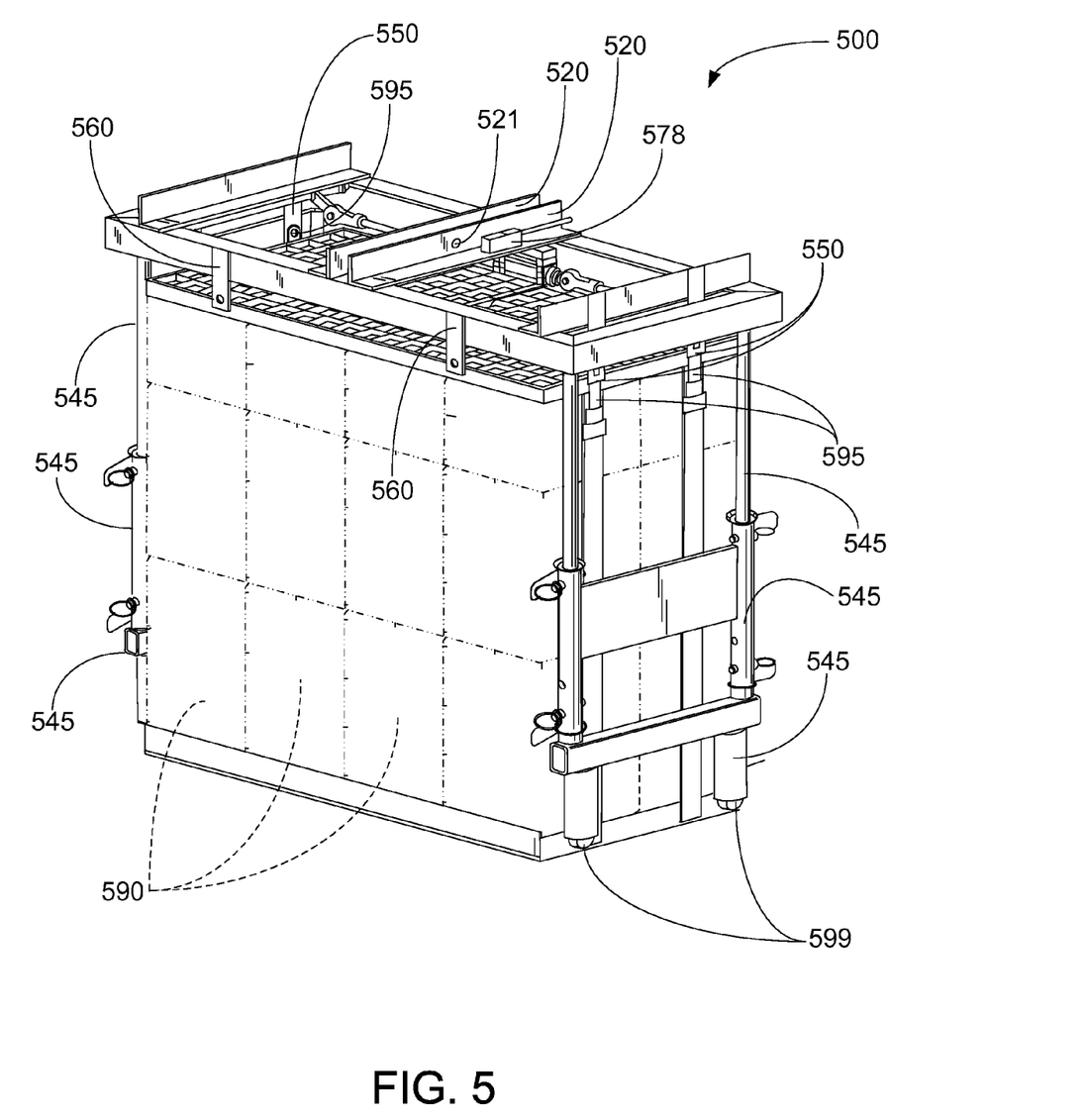
FIG. 5 illustrates a perspective view of one embodiment of the catalyst loading device of the present disclosure straddling catalyst blocks for loading and unloading.

Referring to FIG. 5, the catalyst loading device 500 straddles over the top of the catalyst blocks 590, which would be located between the two legs 545. The catalyst blocks 590 are coupled to the catalyst loading device via the multiple lifting lugs 595 on the catalyst blocks 590 and the corresponding lifting lugs 550 on the catalyst loading device 500. In another embodiment of the present invention, the other lifting lugs 560 may be used to couple the catalyst blocks 590 to the catalyst loading device 500 via corresponding lugs on the catalyst blocks 590.

The present invention facilitates movement of catalyst blocks in an SCR. The catalyst loading device is maneuvered into place over the catalyst blocks and removably coupled to the catalyst blocks for loading and unloading of the blocks in an SCR device.

Referring to FIGS. 4 and 5, Catalyst loading device 500 moves into place via wheels 599 on the top flange surface of the structural support frame (not shown) straddling catalyst blocks 590 between legs 545. Tubes 480 of support structure 440 are positioned to the desired height inside tubes 481 of support legs 445 and pins 483 are inserted through corresponding holes 482 in tubes 480 and 481 to secure the support structure 440 at the desired height. Catalyst blocks 590 are then coupled to the catalyst loading device 500 via the four lifting lugs 595 on the catalyst blocks and the four lifting lugs 550 on the catalyst loading device 500.

Now referring to FIGS. 3 and 3a, in order to lift the catalyst blocks 590, the hydraulic pump 378 provides pressure to the hydraulic cylinders 330 in order to actuate and extend each of the linking rods 360. Preferably, both hydraulic cylinders 330 are actuated simultaneously and to the same degree in order to evenly lift the catalyst blocks 590. One linking rod 360 extends outwardly towards the first end 105 of the catalyst loading device 100 (see also FIG. 1). The other, opposed linking rod 360 extends outwardly towards the second end 106 of the catalyst loading device 100. Each hydraulic cylinder 330 acts on the first end 361 of the linking rods 360. Forces are transmitted along each of the linking rods 360 to the second end 362 that is rotatably connected to a first end 390 of each of the lifting arms 363. A second end of each of the lifting arms 363 is rigidly connected to the lifting rods 370 at a second end 365. Also, rigidly connected to the lifting rods 370 are the lifting cams 367 at a first end 371. The application of force by the hydraulic cylinders 330 to the linking rods 360 causes the lifting rod 370 to rotate since the force is transmitted to the first end 390 of the lifting arms 363. The lifting arms 363, being rigidly connected to the lifting rod 370 at a second end 365 causes the lifting rod 370 and the lifting cam 367 to also rotate about the longitudinal axis of the lifting rod 370. As used herein, rigidly connected elements move together as a unit.

As the lifting cam 367 rotates, the second end 394 engages the lifting frame 315 of the lifting structure 210 (see also FIG. 2), and the force exerted by the hydraulic cylinders 330 is transmitted into the lifting structure 210, causing it to be displaced vertically, thereby lifting the catalyst blocks 590 coupled thereto. Therefore, catalyst blocks 590 are raised off the structural support frame of the SCR device for movement into position for loading and unloading of the blocks into and out of the SCR device.

Once the catalyst blocks are moved into position in the SCR device, the pressure exerted by hydraulic pump 378 may be released, permitting the hydraulic cylinders 330 and their attached linking rods 360 to retract. This permits the assembly of the lifting arm 363, lifting rod 370, and lifting cam 367 to rotate in the opposite direction to lower the lifting frame 210. The lifting frame 210 is then reengaged with the support frame 343 to load and unload the catalyst blocks 590 into and out of the SCR device. Catalyst blocks 590 are de-coupled from lifting frame 210 once they are in a desired position. The catalyst loading device 500 allows the catalyst blocks 590 to be set directly in place without the use of a pry bar, thereby minimizing the chance of personal injury.

The embodiments depicted in FIGS. 1-6 are intended to illustrate in a non-limiting way to the ordinarily skilled artisan the breadth and scope of potential various embodiments of the present invention that may be adapted to various SCR devices and catalyst block designs. Accordingly, other various embodiments are envisioned, such as, the alternative method of welding lifting lugs 160 to the front side 101 and back side 102 of the catalyst loading device 100 on the lifting frame 115 in lieu of lifting lugs 150. In another embodiment envisioned, the hydraulic cylinders may be offset with respect to one another instead of directly opposed and in line with one another. For example, one hydraulic cylinder may be mounted towards the front side of the catalyst loading device, while the other is mounted towards the back side of the catalyst loading device. In yet another embodiment envisioned, multiple lifting mechanisms may be employed, each comprising single or plural sets of hydraulic cylinders. The present invention is not intended to be limited to only the foregoing examples.

The present disclosure has been described with reference to exemplary embodiments, it will be understood that it is not intended that the present invention be limited thereto Obviously, modifications and alterations will occur to others upon reading and understanding the preceding detailed description. In some embodiments of the invention, certain features of the invention may sometimes be used to advantage without a corresponding use of the other features. It is intended that the present disclosure be construed as including all such modifications and alterations insofar as they come within the scope of the appended claims or the equivalents thereof.

The invention claimed is:
1. A catalyst loading device, comprising:
a support structure; and a lifting structure movably engaged with respect to the support structure,
wherein the lifting structure comprises:
a lifting frame;
at least one lifting lug assembled to the lifting frame for coupling catalyst blocks thereto; and
at least one lifting mechanism assembled to the lifting frame,
wherein the at least one lifting mechanism comprises:
at least one cylinder;
at least one linking rod connected to the at least one cylinder;
at least one lifting arm connected to the at least one linking rod;
at least one lifting rod connected to the at least one lifting arm; and
at least one lifting cam connected to the at least one lifting rod.

2. The catalyst loading device according to claim 1, further comprising:
at least one structural member assembled to the lifting structure; and
at least one lifting lug assembled to the at least one structural member for coupling catalyst blocks to the lifting structure.

3. The catalyst loading device according to claim 1, further comprising
at least one L-bracket assembled thereto for moveably engaging with the support structure when lifting the catalyst loading device so that the lifting structure and support structure move together during the lift.

4. The catalyst loading device according to claim 1, further comprising:
at least two structural members assembled to the top of the lifting structure; and
a bar welded between the two structural members to provide a lifting point for loading and unloading the catalyst loading device into and out of a SCR device.

5. The catalyst loading device according to claim 1, wherein the support structure comprises a support frame supported by legs.

6. The catalyst loading device according to claim 5, wherein the legs assembled to the support structure are movably adjustable for height adjustment of the support frame.

7. The catalyst loading device according to claim 6, wherein the support structure further comprises:
legs with holes therein for inserting a pin for securing the support frame at a desired height;
a support brace assembled between the legs to provide support during loading and unloading of the catalyst blocks; and
a bottom support assembled to the legs with wheels attached thereto.

8. The catalyst loading device according to claim 1, wherein the lifting mechanism comprises at least one pump.

9. The catalyst loading device according to claim 1, wherein the lifting rod of the lifting mechanism rotatably extends through a bushing in the support structure.

10. The catalyst loading device according to claim 1, wherein the linking rods of the lifting mechanism comprise a rod; and a clevis and a pin are provided on each end thereof.

11. A catalyst loading device, comprising:
a support structure, and
a lifting structure movably engaged with respect to the support structure,
wherein the lifting structure comprises:
a lifting frame;
at least one lifting lug assembled to the lifting frame for coupling catalyst blocks thereto; and
at least one lifting mechanism assembled to the lifting frame,
wherein the at least one lifting mechanism comprises;
at least one hydraulic cylinder;
at least one linking rod connected to the at least one hydraulic cylinder;
at least one lifting arm connected to the at least one linking rod;
at least one lifting rod connected to the at least one lifting arm; and
at least one lifting cam connected to the at least one lifting rod.

12. The catalyst loading device of claim 11, further comprising at least one hydraulic pump.

13. The catalyst loading device of claim 11, wherein the at least one lifting rod rotatably extends through a bushing in the support structure.

14. The catalyst loading device of claim 11, wherein a clevis and a pin are provided on each end of the at least one linking rod.

15. A method of loading and unloading a catalyst block, comprising the steps of:
coupling the catalyst block to the lifting structure of the catalyst loading device of claim 1;
displacing the lifting structure vertically from the support structure of said loading device, thereby lifting the catalyst block;
moving the catalyst loading device into a desired position; and
decoupling the catalyst blocks from the catalyst loading device.

* * * * *